(12) United States Patent
Jansma

(10) Patent No.: US 11,103,949 B2
(45) Date of Patent: Aug. 31, 2021

(54) QUICK CONNECT CONFIGURATIONS FOR WELDING NECKS AND GAS DIFFUSERS

(71) Applicant: ILLINOIS TOOL WORKS INC., Glenview, IL (US)

(72) Inventor: Jeremy L. Jansma, Lowell, IN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 491 days.

(21) Appl. No.: 15/944,588

(22) Filed: Apr. 3, 2018

(65) Prior Publication Data

US 2018/0281097 A1  Oct. 4, 2018

Related U.S. Application Data

(60) Provisional application No. 62/480,912, filed on Apr. 3, 2017.

(51) Int. Cl.
| | | |
|---|---|---|
| *B23K 9/12* | (2006.01) | |
| *B23K 9/26* | (2006.01) | |
| *B23K 9/29* | (2006.01) | |
| *B23K 9/173* | (2006.01) | |

(52) U.S. Cl.
CPC .............. *B23K 9/123* (2013.01); *B23K 9/173* (2013.01); *B23K 9/26* (2013.01); *B23K 9/295* (2013.01)

(58) Field of Classification Search
CPC .......... B23K 9/123; B23K 9/173; B23K 9/26; B23K 9/295
USPC .................................................... 219/137.31
See application file for complete search history.

(56) References Cited

U.S. PATENT DOCUMENTS

| | | |
|---|---|---|
| 2,297,548 A | 9/1942 | Fox et al. |
| 3,025,387 A | 3/1962 | Kinney |
| 3,083,290 A | 3/1963 | Kennedy |
| 3,121,784 A | 2/1964 | McGinty et al. |
| 3,210,523 A | 10/1965 | Cotter |
| 3,270,179 A | 8/1966 | Russell |
| 3,283,121 A | 11/1966 | Bernard |
| 3,469,070 A | 9/1969 | Bernard et al. |

(Continued)

FOREIGN PATENT DOCUMENTS

| | | |
|---|---|---|
| CA | 2304894 A1 | 11/2000 |
| CH | 509127 | 6/1971 |

(Continued)

OTHER PUBLICATIONS

Excerpt from Victor Equipment Company Brochure, pp. 24,32,34 (1951).

(Continued)

*Primary Examiner* — Dana Ross
*Assistant Examiner* — Joseph W Iskra
(74) *Attorney, Agent, or Firm* — McAndrews, Held & Malloy, Ltd.

(57) ABSTRACT

Some examples of the present disclosure relate to apparatus, systems, and/or methods for providing a quick connect and/or disconnect for a gas diffuser and/or neck assembly, for example, in a welding system. The gas diffuser may include threaded grooves and/or protrusions configured to engage with screw threads and/or channels of the neck assembly. The screw threads, protrusions, threaded grooves, and/or channels may be configured such that the gas diffuser may be quickly connected to, and/or disconnected from, the neck assembly.

15 Claims, 17 Drawing Sheets

(56) References Cited

U.S. PATENT DOCUMENTS

| | | |
|---|---|---|
| 3,487,194 A | 12/1969 | Poulton et al. |
| 3,488,468 A | 1/1970 | Carbone |
| 3,514,570 A | 5/1970 | Bernard |
| 3,529,126 A | 9/1970 | Reeh |
| 3,529,128 A | 9/1970 | Cruz |
| 3,541,298 A | 11/1970 | Carkhuff |
| 3,576,423 A | 4/1971 | Bernard |
| 3,596,049 A | 7/1971 | Ogden |
| 3,597,576 A | 8/1971 | Bernard et al. |
| 3,629,547 A | 12/1971 | Kester et al. |
| 3,659,076 A | 4/1972 | Ogden, Sr. |
| 3,689,732 A | 9/1972 | Hill |
| 3,689,733 A | 9/1972 | Matasovic |
| 3,825,720 A | 7/1974 | Zillinger |
| 3,878,354 A | 4/1975 | Frantzreb |
| 3,934,782 A | 1/1976 | Cushman et al. |
| 3,940,586 A | 2/1976 | Stearns et al. |
| 4,008,384 A | 2/1977 | Cecil |
| 4,049,943 A | 9/1977 | Pratt |
| 4,158,763 A | 6/1979 | Moerke |
| 4,280,043 A | 7/1981 | Feix |
| 4,297,561 A | 10/1981 | Townsend |
| 4,365,137 A | 12/1982 | Tarasov |
| 4,403,136 A | 9/1983 | Colman |
| 4,529,863 A * | 7/1985 | Lebel ............... B23K 9/173 219/137.42 |
| 4,554,432 A | 11/1985 | Raloff |
| 4,563,569 A | 1/1986 | Shiramizu |
| 4,672,163 A | 6/1987 | Matsui |
| 4,675,493 A | 6/1987 | Gartland |
| 4,731,518 A | 3/1988 | Parmelee |
| 4,767,908 A | 8/1988 | Dallavalle |
| 4,864,099 A | 9/1989 | Cusick |
| 4,945,208 A | 7/1990 | Lian |
| 4,954,688 A | 9/1990 | Winterfeldt |
| 4,978,831 A | 12/1990 | Lian |
| 4,994,707 A | 2/1991 | Stark |
| 5,013,885 A | 5/1991 | Carkhuff |
| 5,097,108 A | 3/1992 | Hamal |
| 5,132,513 A | 7/1992 | Ingwersen et al. |
| 5,258,599 A | 11/1993 | Moerke |
| 5,260,546 A | 11/1993 | Ingwersen |
| 5,338,917 A | 8/1994 | Stuart |
| 5,380,980 A | 1/1995 | Colling |
| 5,440,100 A | 8/1995 | Stuart |
| 5,491,321 A | 2/1996 | Stuart |
| 5,635,090 A | 6/1997 | Lubieniecki |
| 5,669,556 A | 9/1997 | Yoshida |
| 5,726,420 A | 3/1998 | Lajoie |
| 5,760,373 A | 6/1998 | Colling |
| 5,772,102 A | 6/1998 | New |
| 6,075,227 A | 6/2000 | Lajoie |
| 6,078,023 A | 6/2000 | Jones |
| 6,163,008 A | 12/2000 | Roberts |
| 6,191,380 B1 | 2/2001 | Thomas |
| 6,225,599 B1 | 5/2001 | Altekruse |
| 6,271,497 B1 | 8/2001 | Zapletal |
| 6,307,179 B1 | 10/2001 | Walters |
| 6,525,297 B2 | 2/2003 | Doherty |
| 6,657,162 B2 | 12/2003 | Jung |
| 6,689,987 B2 | 2/2004 | Altekruse et al. |
| 6,744,013 B2 * | 6/2004 | Jones ............... B23K 9/295 219/137.42 |
| 6,847,009 B2 | 1/2005 | Stuart |
| 6,924,461 B2 | 8/2005 | Matiash |
| 7,105,775 B2 | 9/2006 | Giese |
| 7,176,412 B2 | 2/2007 | Wells |
| 7,244,909 B2 | 7/2007 | Kensrue et al. |
| 7,271,366 B2 | 9/2007 | Kensrue |
| 7,342,200 B2 | 3/2008 | Eberle |
| 7,381,923 B2 | 6/2008 | Gordon et al. |
| 7,576,300 B2 | 8/2009 | Giese |
| 7,905,741 B1 | 3/2011 | Wade et al. |
| 9,302,341 B2 | 4/2016 | Oh et al. |
| 9,308,599 B2 | 4/2016 | Sadowski |
| 9,527,155 B2 | 12/2016 | Meess |
| 9,539,663 B2 | 1/2017 | Grossauer et al. |
| 9,669,486 B2 | 6/2017 | Dingeldein |
| 9,742,140 B2 * | 8/2017 | Crowe ............... H01R 43/26 |
| 9,950,386 B2 | 4/2018 | Cooper et al. |
| 10,052,708 B2 | 8/2018 | Redding et al. |
| 2002/0113047 A1 | 8/2002 | Doherty |
| 2002/0117484 A1 | 8/2002 | Jones et al. |
| 2003/0057196 A1 | 3/2003 | Jones |
| 2003/0209530 A1 | 11/2003 | Stuart |
| 2004/0026394 A1 | 2/2004 | Giese |
| 2004/0026395 A1 | 2/2004 | Giese |
| 2004/0079741 A1 | 4/2004 | Keegan |
| 2004/0079784 A1 | 4/2004 | Giese |
| 2005/0109738 A1 | 5/2005 | Hewett et al. |
| 2006/0226132 A1 | 10/2006 | Giese |
| 2006/0226133 A1 | 10/2006 | Giese |
| 2006/0226134 A1 | 10/2006 | Giese et al. |
| 2006/0289413 A1 | 12/2006 | Eberle |
| 2007/0062922 A1 | 3/2007 | Zamuner |
| 2007/0108173 A1 | 5/2007 | Zamuner |
| 2007/0210049 A1 | 9/2007 | Dingeldein |
| 2010/0012637 A1 | 1/2010 | Jaegar |
| 2011/0006522 A1 | 1/2011 | Bichler et al. |
| 2012/0125903 A1 | 5/2012 | Izutani et al. |
| 2013/0112661 A1 | 5/2013 | Dambra |
| 2013/0126504 A1 | 5/2013 | Hassan |
| 2013/0126505 A1 | 5/2013 | Hassan |
| 2013/0126506 A1 | 5/2013 | Hassan |
| 2013/0134143 A1 | 5/2013 | Hassan |
| 2014/0131335 A1 * | 5/2014 | Giese ............... B23K 9/295 219/137.42 |
| 2014/0131336 A1 | 5/2014 | Jacques |
| 2014/0251972 A1 | 9/2014 | Garvey et al. |
| 2014/0263251 A1 | 9/2014 | Enyedy |
| 2014/0263253 A1 | 9/2014 | Meess |
| 2014/0263254 A1 | 9/2014 | Enyedy |
| 2014/0312023 A1 * | 10/2014 | Centner ............... B23K 9/29 219/137.42 |
| 2014/0374399 A1 | 12/2014 | Kachline |
| 2015/0129570 A1 | 5/2015 | Redding |
| 2015/0129571 A1 | 5/2015 | Hassan |
| 2015/0129572 A1 | 5/2015 | Hassan |
| 2015/0135796 A1 | 5/2015 | Hassan |
| 2015/0136747 A1 | 5/2015 | Hassan |
| 2015/0136748 A1 | 5/2015 | Hassan |
| 2015/0136749 A1 | 5/2015 | Hassan |
| 2015/0165542 A1 | 6/2015 | Hassan |
| 2015/0190879 A1 | 7/2015 | Kachline |
| 2016/0144446 A1 | 5/2016 | Centner |
| 2017/0080511 A1 | 3/2017 | Roger |

FOREIGN PATENT DOCUMENTS

| | | |
|---|---|---|
| DE | 2528972 A1 | 12/1976 |
| DE | 202013102979 | 7/2013 |
| EP | 1388388 | 2/2004 |
| EP | 2457682 | 5/2012 |
| FR | 2291819 | 11/1974 |
| FR | 2291819 A1 | 6/1976 |
| FR | 2349389 A1 | 11/1977 |
| GB | 2098115 A | 11/1982 |
| JP | H05196022 U | 8/1976 |
| JP | 5290444 | 7/1977 |
| JP | S55156680 A | 12/1980 |
| JP | S57134279 A | 8/1982 |
| KR | 100647458 * | 5/2005 |
| WO | 0073700 A1 | 12/2000 |
| WO | 2007030720 | 3/2007 |
| WO | 2008018979 | 4/2008 |

OTHER PUBLICATIONS

Excerpt from Victor Equipment Company Welding and Cutting Equipment Brochure, Catalog 20C 10-51 CW (1965).

(56) References Cited

OTHER PUBLICATIONS

International Search Report from PCT application No. PCT/US2016/050153, dated Dec. 8, 2016, 13 pgs.

\* cited by examiner

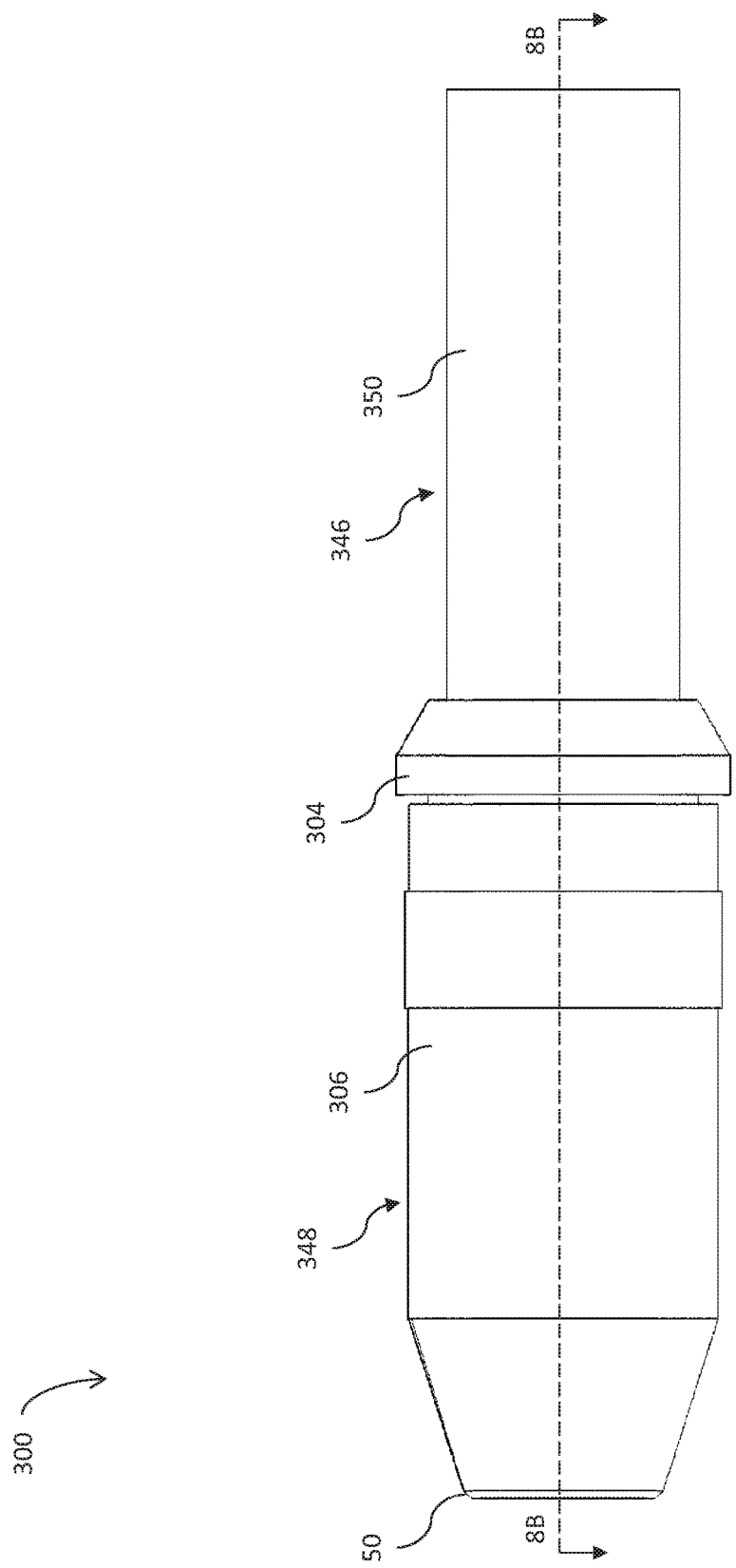

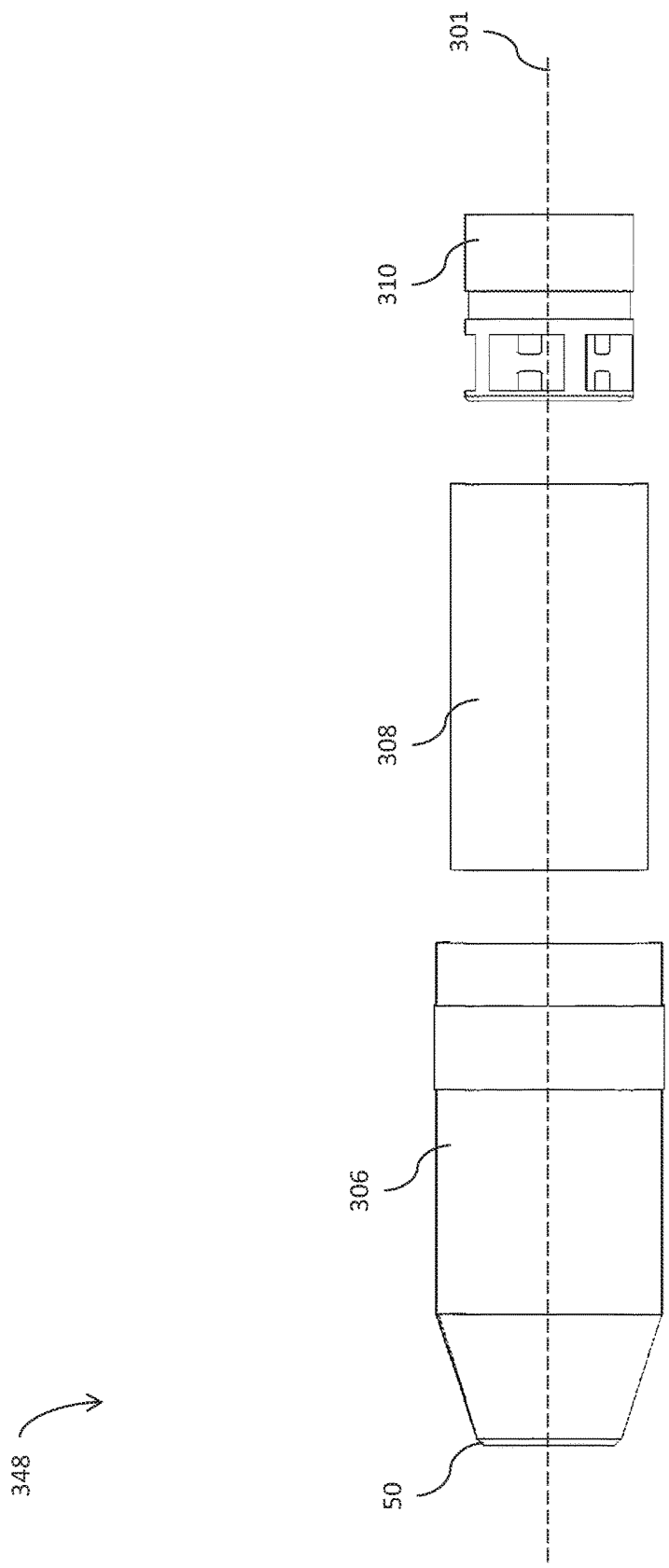

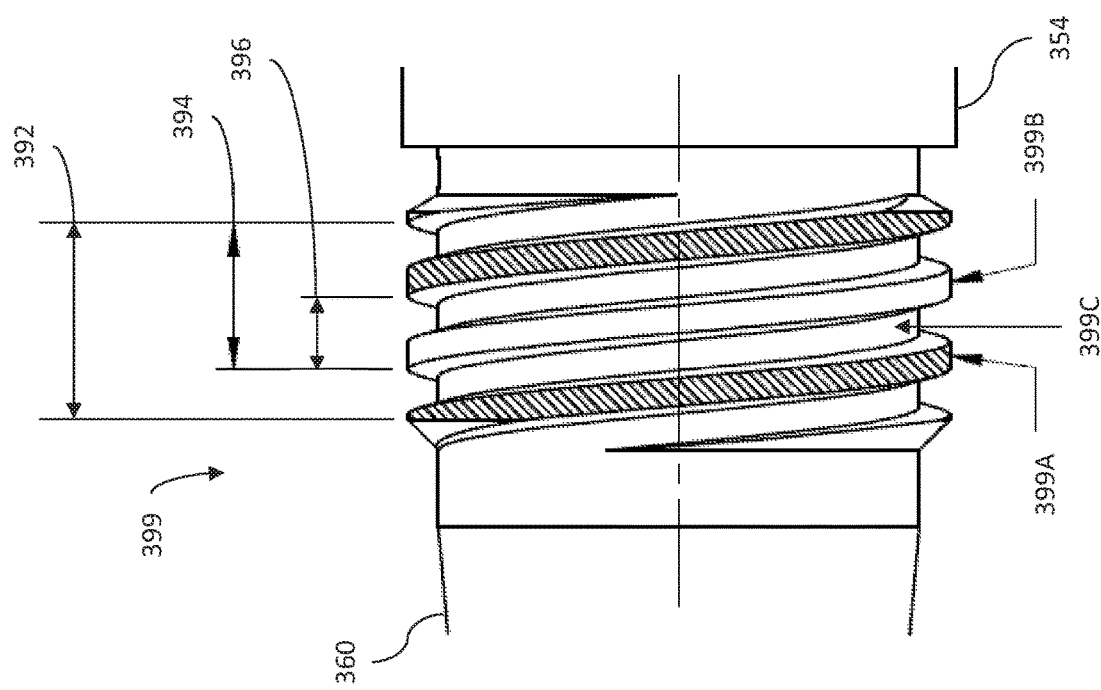

| DIMENSION | | CUSTOM 0.425-16 DOUBLE STUB ACME - 2G | CUSTOM 0.527-14 DOUBLE STUB ACME - 2G |
|---|---|---|---|
| 598A | MAX | 0.3906 | 0.4882 |
| | MIN | 0.3875 | 0.4846 |
| 598B | MAX | 0.4177 | 0.5184 |
| | MIN | 0.4062 | 0.5061 |
| 598C | MAX | 0.4464 | 0.5499 |
| | MIN | 0.4350 | 0.5375 |
| 398D | MAX | 0.3775 | 0.4746 |
| | MIN | 0.3661 | 0.4623 |
| 398E | MAX | 0.4010 | 0.5003 |
| | MIN | 0.3896 | 0.4879 |
| 398F | MAX | 0.4250 | 0.5275 |
| | MIN | 0.4219 | 0.5239 |
| 394, 594 (Lead) | | 0.1250 | 0.1429 |
| 396, 596 (Pitch) | | 0.0625 | 0.0714 |

FIG. 7

QUICK CONNECT CONFIGURATIONS FOR WELDING NECKS AND GAS DIFFUSERS

CROSS REFERENCE TO RELATED APPLICATIONS

The present application claims the benefit of U.S. Provisional Patent Application No. 62/480,912, entitled "WELDING NECK AND GAS DIFFUSER QUICK CONNECT," filed Apr. 3, 2017, the entire contents of which are expressly incorporated herein by reference.

TECHNICAL FIELD

The present disclosure generally relates to welding torches, and, more particularly, to quick connect and/or disconnect configurations for welding necks and/or gas diffusers.

BACKGROUND

Welding torches sometimes include gas diffusers to help route shielding gas to a weld. In some cases, the gas diffusers may be connected to a neck of the welding torch via a screw connection. Gas diffusers may be screwed onto and/or off of the necks when assembling and/or disassembling welding torches.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to apparatuses, systems, and methods for providing a quick connect and/or disconnect for gas diffusers and/or welding necks, such as in a welding system, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

FIG. 3B is a side view of the example neck and nozzle assembly of FIG. 3A, in accordance with aspects of this disclosure.

FIG. 4C is an exploded view of an example nozzle assembly of the neck and nozzle assembly of FIG. 4A, in accordance with aspects of this disclosure.

FIGS. 6C and 6D are enlarged views of screw threads of the neck inner portion of FIG. 6B, in accordance with aspects of this disclosure.

FIG. 7 is a table showing various dimensions of the example threaded grooves of FIG. 5D and example screw threads of FIG. 6C, in accordance with aspects of the present disclosure.

DETAILED DESCRIPTION

Figure 1:
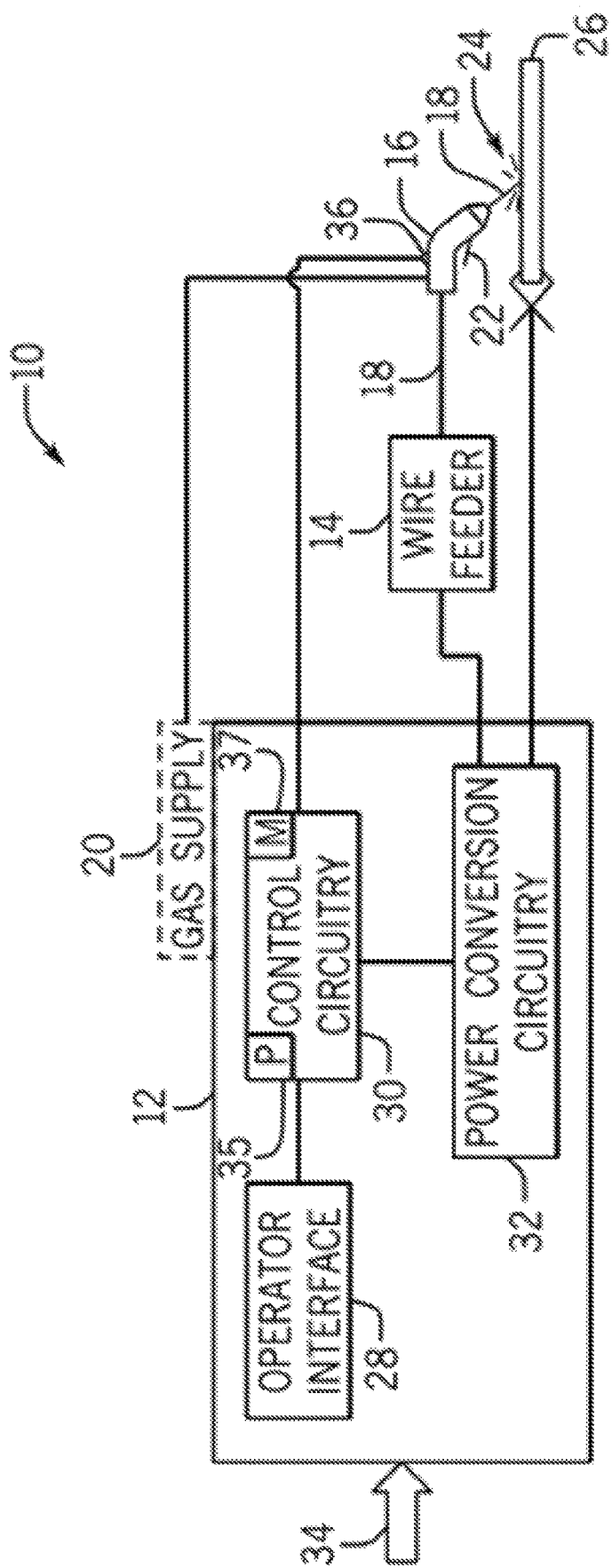
FIG. 1 is an example of a welding system, in accordance with aspects of this disclosure.

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the term "exemplary" means serving as a non-limiting example, instance, or illustration. As utilized herein, the terms "e.g." and "for example" set off lists of one or more non-limiting examples, instances, or illustrations.

As used herein, a welding-type power supply and/or power source refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Welding-type power, as used herein, refers to power suitable for welding, cladding, plasma cutting, induction heating, CAC-A and/or hot wire welding/preheating (including laser welding and laser cladding), carbon arc cutting or gouging, and/or resistive preheating.

The terms "coupled," "coupled to," and "coupled with" as used herein, each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

The terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, the terms "front" and/or "forward" refer to locations closer to a welding arc, while "rear," "behind," and/or "backward" refers to locations farther from a welding arc.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

Some examples of the present disclosure relate to a welding torch, comprising a neck assembly having a protrusion, and a gas diffuser having a passage configured to interface with the protrusion to connect the gas diffuser to the neck assembly in approximately 1.5 turns or less.

In some examples, the protrusion is a screw thread, and the passage is a threaded groove. In some examples, the screw thread and the threaded groove are based on a custom double-start stub ACME thread. In some examples, the neck assembly includes a locking taper that is configured to interface with a complementary taper of the gas diffuser. In some examples, the screw thread comprises a first thread and a second thread, and the threaded groove comprises a first groove configured to interface with the first thread, and a second groove configured to interface with the second thread. In some examples, the screw thread has a total axial length that is approximately 1.5 times or less an axial lead length of the screw thread. In some examples, the threaded groove has a total axial length that is approximately 1.5 times or less an axial lead length of the threaded groove. In some examples, the passage comprises an axially (and/or longitudinally) extending keyway that leads to a radially (and/or circumferentially, circularly) extending channel.

Some examples of the present disclosure relate to a neck assembly for use with a welding torch, comprising a neck inner having a protrusion that is configured to interface with a passage of a gas diffuser, where the protrusion is configured to remove the gas diffuser from the neck inner in approximately 1.5 turns or less.

In some examples, the protrusion is a screw thread. In some examples, the screw thread is based on a custom double-start stub ACME thread. In some examples, the screw thread comprises a first thread and a second thread. In some examples, the screw thread has a total axial length that is approximately 1.5 times or less an axial lead length of the screw thread. In some examples, the neck assembly includes a locking taper and an insulator, and the protrusion is disposed between the locking taper and the insulator. In some examples, the neck assembly further includes an outer neck armor, the outer neck armor surrounds the insulator, and at least part of the neck inner is positioned within the insulator.

Some examples of the present disclosure relate to a gas diffuser for use in a welding torch, comprising a gas diffuser housing having a passage that is configured to interface with a protrusion of a neck assembly, where the passage is configured to connect the gas diffuser to, or disconnect the gas diffuser from, the neck assembly in approximately 1.5 turns or less.

In some examples, the passage comprises a threaded groove. In some examples, the threaded groove is based on a custom double-start stub ACME thread. In some examples, the threaded groove comprises a first groove and a second groove. In some examples, the threaded groove has a total axial length that is approximately 1.5 times or less an axial lead length of the threaded groove. In some examples, the gas diffuser includes a taper that is configured to interface with a locking taper of the neck assembly.

Some examples of the present disclosure relate to apparatuses, systems, and/or methods that provide a quick connect to, and/or a quick disconnect from, a gas diffuser and/or welding torch neck. Gas diffusers and/or welding torch necks may be used, for example, in a welding torch assembly of a welding system. In some examples, a custom thread design for an end of the welding torch neck (e.g., a MIG welding gun neck) is provided for quick assembly and/or removal of the gas diffuser from the neck.

Conventional welding gun necks can include, for example, a standard tapered pipe thread or a standard thread form such as ISO, ANSI, etc. These types of threads may require multiple turns of the gas diffuser by the user when assembling (i.e., connecting) and/or removing (i.e., disconnecting) a gas diffuser from a neck of a welding torch (and/or welding gun).

Some examples of the present disclosure provide a custom-sized double-start stub ACME thread that provides for the gas diffuser in a welding torch to be assembled (i.e., connected) or removed (i.e., disconnected, disassembled, etc.) from a welding torch neck with approximately 1.5 turns or less of the gas diffuser and/or welding torch neck (e.g., 1.3, 1.4, 1.5, 1.6, or 1.7 turns). In some examples, the custom thread may be configured to allow assembly/disassembly from a welding torch neck with approximately 2 turns (or less) of the gas diffuser and/or welding torch neck (e.g., 1.8, 1.9, 2.0, 2.1, or 2.2 turns). This substantially reduces the amount of time required to assemble (i.e., connect) and/or remove (i.e., disconnect) a gas diffuser. The customization of the double-start stub ACME thread relates to a custom-sized major diameter, minor diameter, pitch diameter, thread lead, and/or thread pitch.

Some examples of the present disclosure provide that the sizing of the custom stub ACME thread (e.g., diameters, pitch, etc.) can vary depending on the size of the welding torch neck (e.g., welding gun neck) and the mating gas diffuser. The custom thread can also be constructed by using another standard thread such as, for example, ISO, ANSI, etc. This thread can be used in combination with a locking taper as shown in U.S. Pat. No. 7,176,412, which is hereby incorporated by reference in its entirety, or with a face-to-face mating connection.

FIG. 1 shows an example of a welding-type system 10. While the specific welding-type system 10 of FIG. 1 is a gas metal arc welding (GMAW) system, other types of welding-type systems may be used. FIG. 1 illustrates the welding-type system 10 as including a welding-type power source 12 coupled to a wire feeder 14, though, in some examples, the wire feeder 14 may be removed from the system 10. In the example of FIG. 1, the power source 12 supplies welding-type power to a torch 16 through the wire feeder 14. In some examples, the power source 12 may supply welding-type power directly to the torch 16 rather than through the wire feeder 14. In the example of FIG. 1, the wire feeder 14 supplies a wire electrode 18 (e.g., solid wire, cored wire, coated wire) to the torch 16. A gas supply 20, which may be integral with or separate from the power source 12, supplies a gas (e.g., CO2, argon) to the torch 16. In some examples, no gas supply 20 may be used. An operator may engage a trigger 22 of the torch 16 to initiate an arc 24 between the electrode 18 and a work piece 26. In some examples, engaging the trigger 22 of the torch 16 may initiate a different welding-type function, instead of an arc 24.

In some examples, the welding system 10 may receive weld settings from the operator via an operator interface 28 provided on the power source 12 (and/or power source housing). The weld settings may be communicated to control circuitry 30 within the power source 12 that controls generation of welding-type power for carrying out the desired welding-type operation. In the example of FIG. 1, the control circuitry 30 is coupled to the power conversion circuitry 32, which may supply the welding-type power (e.g., pulsed waveform) that is applied to the torch 16. In the example of FIG. 1, the power conversion circuitry 32 is coupled to a source of electrical power as indicated by arrow 34. The source may be a power grid, an engine-driven generator, batteries, fuel cells or other alternative sources.

In some examples, the control circuitry 30 may control the current and/or the voltage of the welding-type power supplied to the torch 16. The control circuitry 30 may monitor the current and/or voltage of the arc 24 based at least in part on one or more sensors 36 within the wire feeder 14 and/or torch 16. In some examples, a processor 35 of the control circuitry 30 may determine and/or control the arc length or electrode extension based at least in part on feedback from the sensors 36. The processor 35 may determine and/or control the arc length or electrode extension utilizing data (e.g., algorithms, instructions, operating points) stored in a memory 37. The data stored in the memory 37 may be received via the operator interface 28, a network connection, or preloaded prior to assembly of the control circuitry 30.

Figure 2:
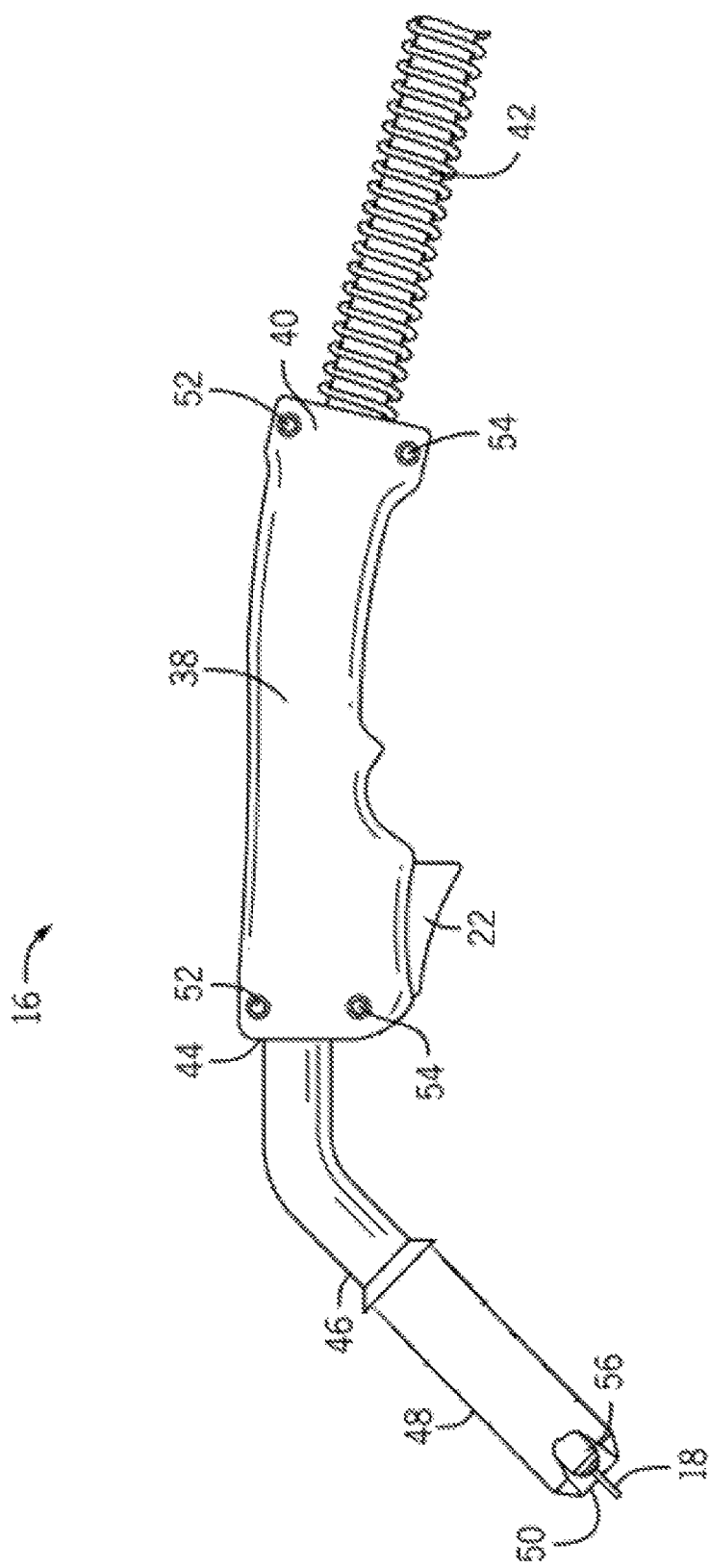
FIG. 2 is a side view of an example welding torch used the welding system of FIG. 1, in accordance with aspects of this disclosure.

FIG. 2 is an example welding torch 16 that may be used in and/or with the example welding system of FIG. 1. The torch 16 includes a handle 38 attached to a trigger 22. The trigger 22 may be actuated to initiate a weld (and/or other welding-type operation). At a rear end 40, the handle 38 is coupled to a cable 42 where welding consumables (e.g., the electrode 18, the shielding gas, and so forth) are supplied to the weld. Welding consumables generally travel through the handle 38 and exit at a front end 44, which is disposed on the handle 38 at an end opposite from the rear end 40.

The torch 16 includes a neck 46 (e.g., a gooseneck) extending out of the front end 44 of the handle 38. As such, the neck 46 is coupled between the handle 38 and a welding nozzle 48. As should be noted, when the trigger 22 is pressed or actuated, welding wire (e.g., electrode 18) travels through the cable 42, the handle 38, the neck 46, and the welding nozzle 48, so that the welding wire extends out of the front end 50 (i.e., torch tip) of the welding nozzle 48. The handle 38 is secured to the neck 46 via fasteners 52 and 54, and to the cable 42 via fasteners 52 and 54. The welding nozzle 48 is illustrated with a portion of the welding nozzle 48 removed to show the electrode 18 extending out of a contact tip 56 that is disposed within the welding nozzle 48. While the example torch 16 illustrated in FIG. 2 is designed for welding by a human operator, one or more torches designed for use by a robotic welding system may alternatively, or additionally, be used with the welding system of FIG. 1. For example, the torch 16 may be modified to omit the trigger 22, may be adapted for water cooling, etc.

Figure 3A:
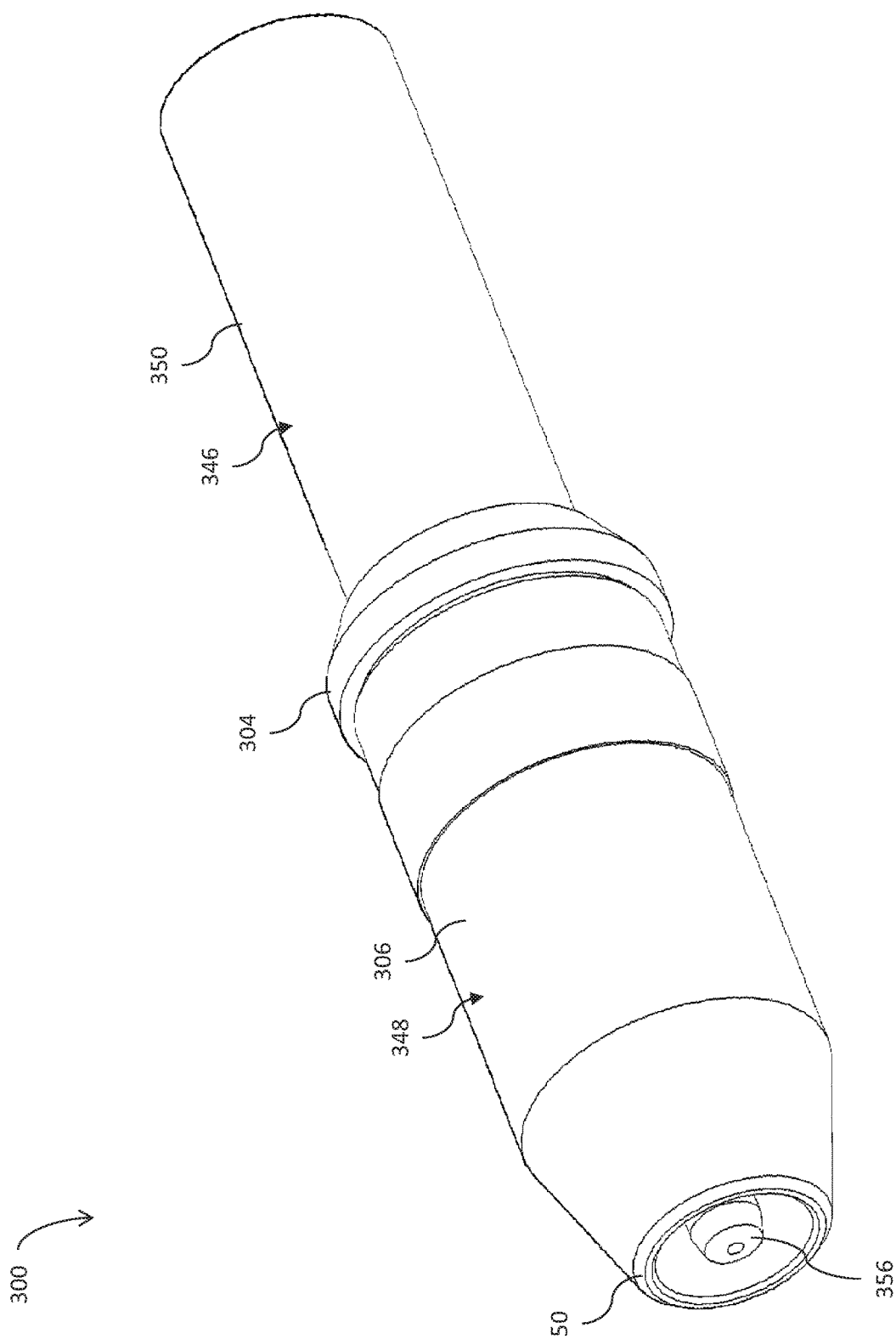
FIG. 3A is a perspective view of an example neck and nozzle assembly that may be used in the example welding torch of FIG. 2, in accordance with aspects of this disclosure.
Figure 4A:
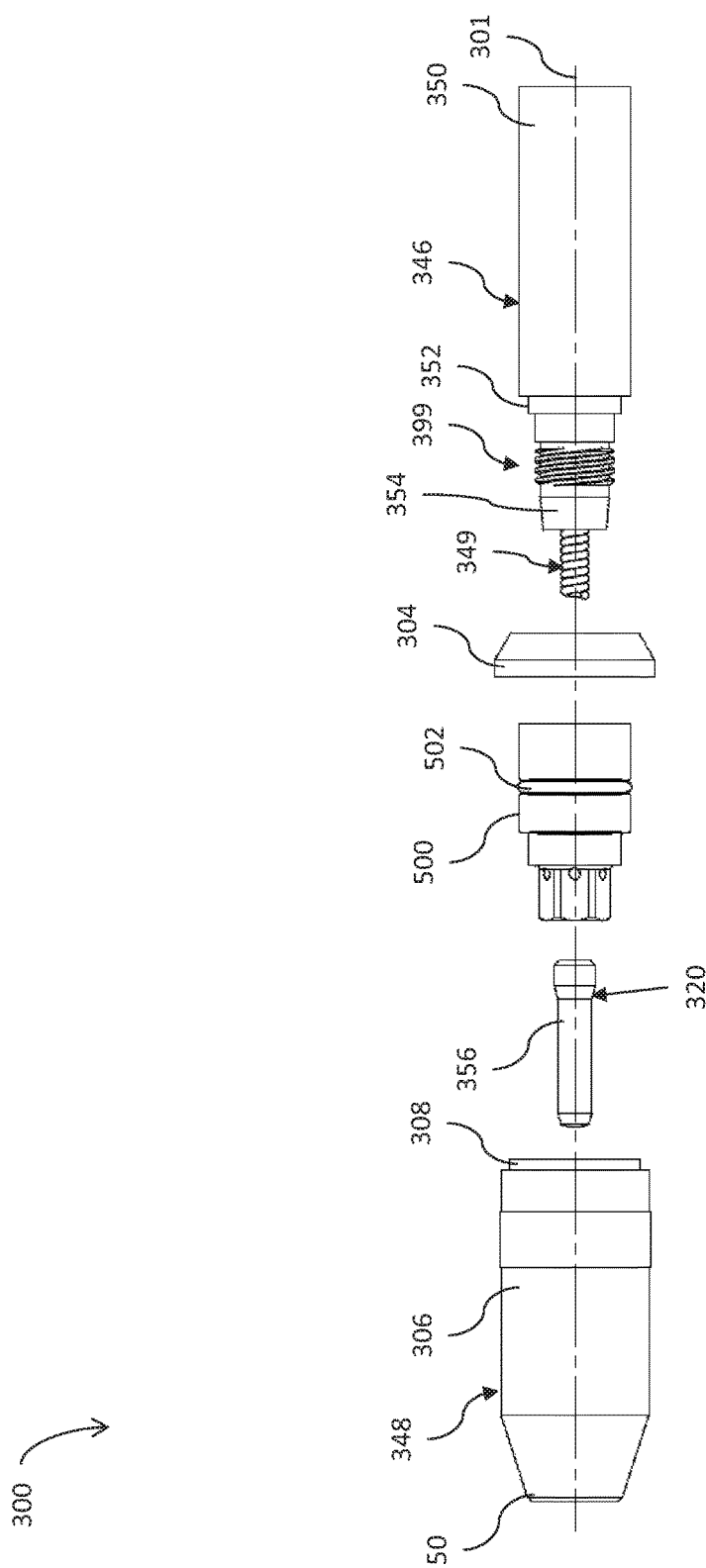
FIG. 4A is an exploded view of the example neck and nozzle assembly of FIG. 3A, in accordance with aspects of this disclosure.

FIGS. 3A and 3B show an example neck and nozzle assembly 300 that may be used with the welding torch 16 of FIG. 2, and/or welding-type system 10 of FIG. 1. In the example of FIGS. 3A and 3B, the neck and nozzle assembly 300 includes a nozzle assembly 348, an insulator cap 304 (e.g., an electrical insulator cap), a contact tip 356, and a neck assembly 346 (e.g., a MIG and/or GMAW welding neck assembly). FIG. 4A shows an exploded view of the example neck and nozzle assembly 300 of FIGS. 3A and 3B. As shown in the example of FIG. 4A, the neck and nozzle assembly 300 further includes a gas diffuser 500 having an O-ring 502. FIG. 4A also shows a liner assembly 349, which is part of the neck assembly 346. In the example of FIG. 4A, the components of the neck and nozzle assembly 300 are centered about (and/or around, along, etc.) a longitudinal axis 301.

Figure 4B:
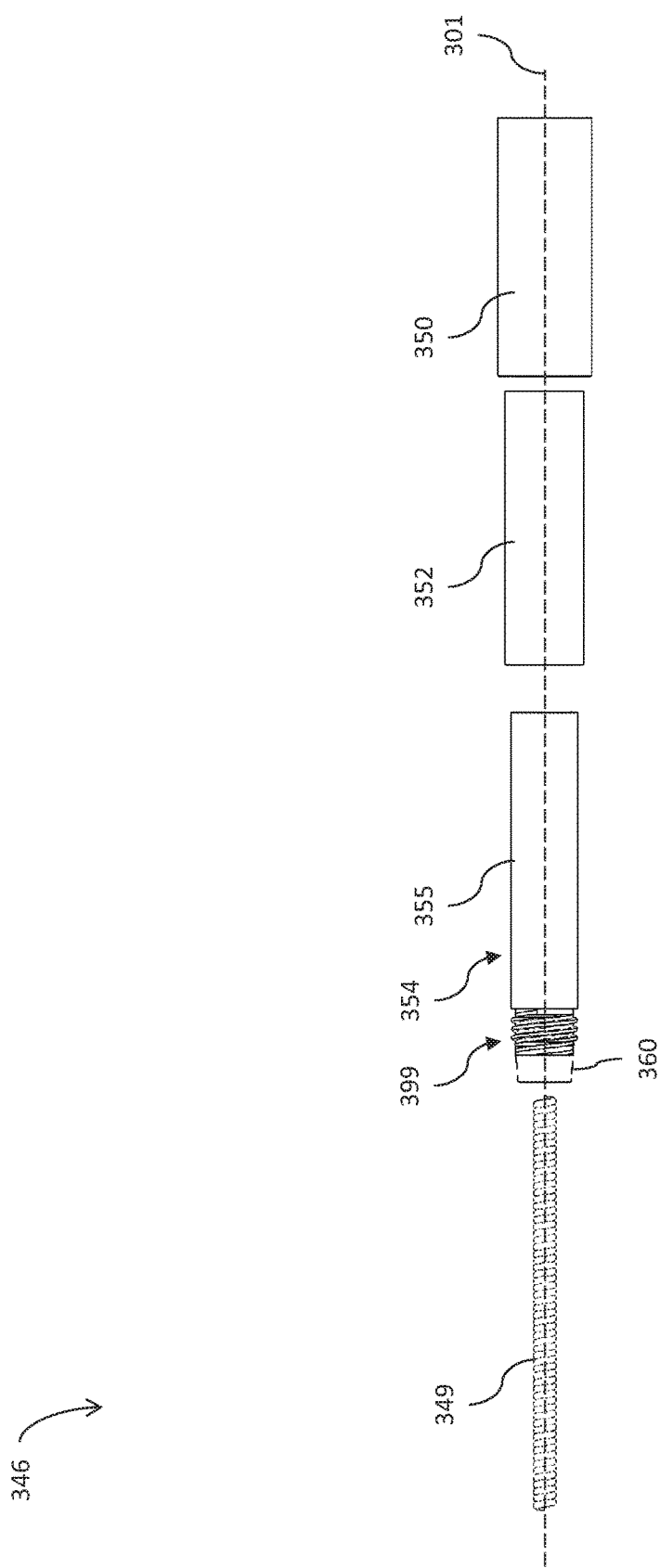
FIG. 4B is an exploded view of an example neck assembly of the neck and nozzle assembly of FIG. 4A, in accordance with aspects of this disclosure.

FIGS. 4B and 4C show exploded views of the example neck assembly 346 and nozzle assembly 348, respectively. In the example of FIG. 4B, the neck assembly 346 includes an outer neck armor 350, a neck insulation 352 (e.g., electrical neck insulation), a neck inner portion 354 (e.g., an electrically conductive neck inner portion), and a liner assembly 349. In the example of FIG. 4C, the outer neck armor 350, neck insulation 352, and neck inner portion 354 are generally cylindrical and hollow, with cylindrical bores centered about the axis 301 extending through the components.

The neck inner portion 354 may be comprised of an electrically conductive material. In the example of FIGS. 4A and 4B, the neck inner portion 354 includes screw threads 399 (e.g., a custom double start stub ACME screw thread) configured for coupling to the gas diffuser 500, as will be discussed further below. The neck inner portion 354 further includes a base 355 to the rear of the screw threads 399. A nose 362 of the neck inner portion 354 includes a locking taper 360, forward of the screw threads 399. The locking taper 360 may be configured to abut and/or engage with a complementary locking taper 560 of the gas diffuser 500 to assist with this coupling. The neck insulation 352 provides electrical (and/or thermal) insulation between the neck inner portion 354 and the outer neck armor 350, and may be formed of an electrically insulating material. The liner assembly 349 provides a conduit through which the electrode 18 may travel from the torch handle 38 to the front end 50 of the nozzle assembly 348. The outer neck armor 350, neck insulation 352, neck inner portion 354, and liner assembly 349 include bores extending through their center which are aligned along a longitudinal axis 301. When the neck assembly 346 is fully assembled, the liner assembly 349 is positioned within the bore of the neck inner portion 354, the neck inner portion 354 is positioned within the bore of the neck insulation 352, and the neck insulation 352 is positioned within the bore of the outer neck armor 350.

The nozzle assembly 348 includes a nozzle body 306, a nozzle insulator 308 (e.g., a nozzle electrical insulator), and a tip-retention device 310 (e.g., a nozzle insert). The tip-retention device 310 helps to retain the contact tip 356 within the nozzle assembly 348. The nozzle insulator 308 provides electrical (and/or thermal) insulation within the nozzle assembly 348, and may be formed of an electrically insulating material. In the example of FIG. 4C, the nozzle body 306 and nozzle insulator 308 are generally cylindrical. In the example of FIG. 4C, the nozzle body 306, nozzle insulator 308, and tip-retention device 310 include a bore centered about a common longitudinal axis 301. When the nozzle assembly 348 is assembled, the tip-retention device 310 is positioned within the nozzle insulator 308, and the nozzle insulator 308 is positioned within the nozzle body 306.

In some examples, the tip-retention device 310 can be, for example, a nozzle insert or a nozzle addition that is crimped into or outside of the nozzle body 306. In other examples, the tip-retention device 310 can be an integral part of the nozzle body 306 or the nozzle assembly 348. In some examples, the tip-retention device 310 is configured to provide clearance for gas flow by providing channels through a side wall to direct gas inwardly towards the contact tip 356. The inward gas flow is directed at the contact tip 356 which provides a cooling effect on the contact tip. Inwardly facing gas channels (e.g., radial channels) resist spatter collection in comparison to forward-facing gas holes (e.g., axial channels). Spatter can be removed from the front face of the tip-retention device 310 using a nozzle reamer or welpers. In some examples (e.g., as shown in FIG. 8B), the tip-retention device 310 includes a taper 321 that is configured to lock the contact tip 356 in place. In some examples, the contact tip 356 has a locking taper 320 that is configured to engage with the taper 321 in the tip-retention device 310 to maintain concentricity and conductivity. In some examples, the contact tip 356 also includes a stepped profile or a backwards facing taper to engage with the gas diffuser 500 and to assist in maintaining concentricity and alignment with liner assembly 349.

In some examples, the contact tip 356 may be threaded or threadless. If threadless, no tool may be necessary to insert the contact tip 356 into the neck and nozzle assembly 300, for example. In some examples, the contact tip 356 can be secured with the use of a tool. In some examples, the contact tip may provide a consumable electrode 18. In some examples, the contact tip 356 may be replaced with an electrode 18, such as in examples where the welding torches do not provide and/or use a consumable electrode 18.

Figure 5B:
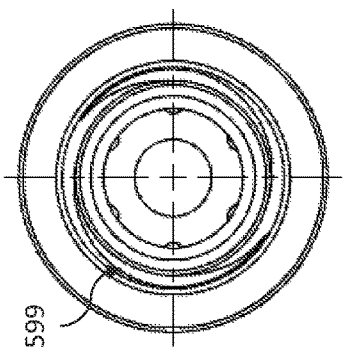
FIG. 5B is an end view of the example gas diffuser of FIG. 5A, in accordance with aspects of this disclosure.
Figure 5A:
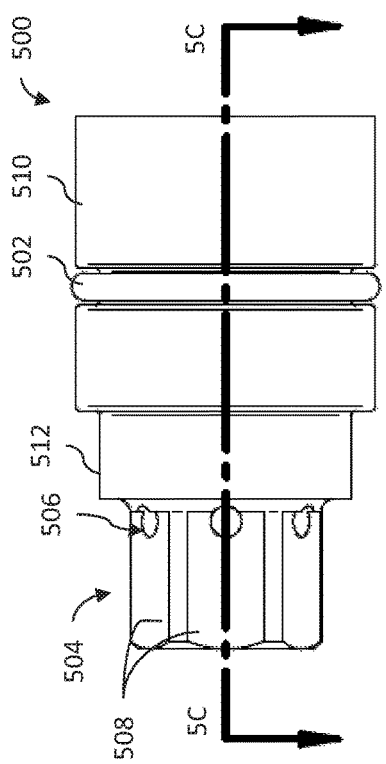
FIG. 5A is a side view of an example gas diffuser, in accordance with aspects of this disclosure.
Figure 5C:
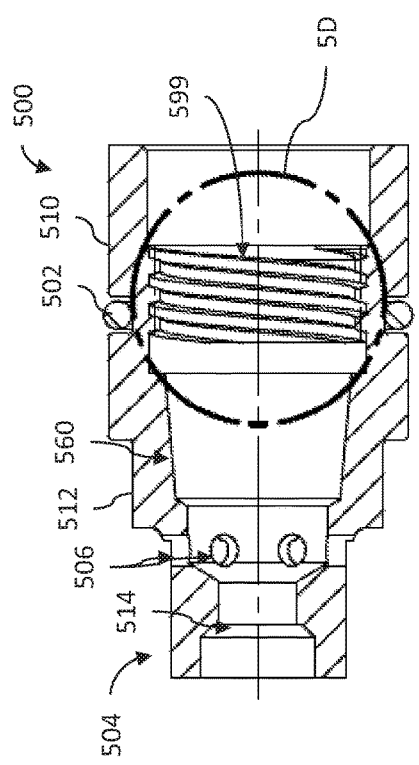
FIG. 5C is a cross section of the example gas diffuser of FIG. 5A, along line 5C-5C of FIG. 5A, in accordance with aspects of this disclosure.
Figure 5D:
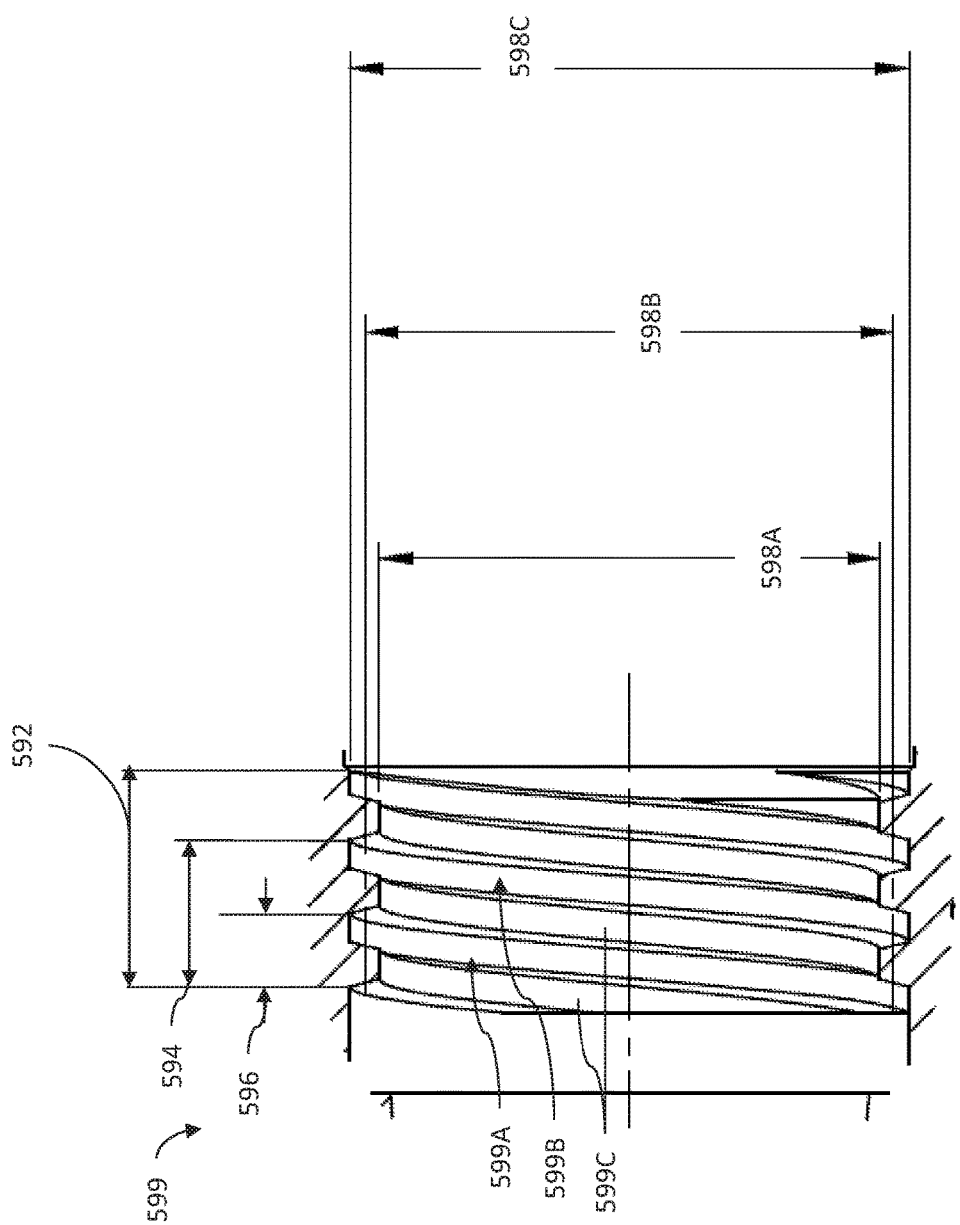
FIG. 5D is an enlarged view of threaded grooves of the example gas diffuser of FIG. 5C, in accordance with aspects of this disclosure.
Figure 6A:
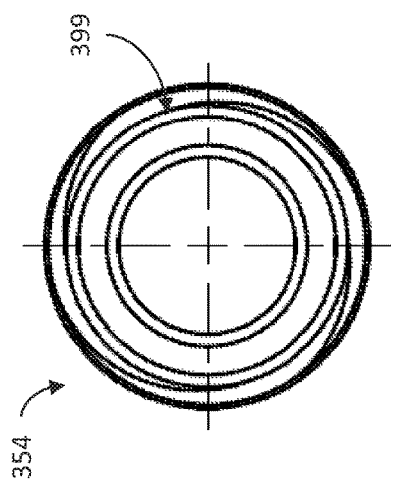
FIG. 6A is an end view of an example neck inner portion, in accordance with aspects of this disclosure.
Figure 6B:
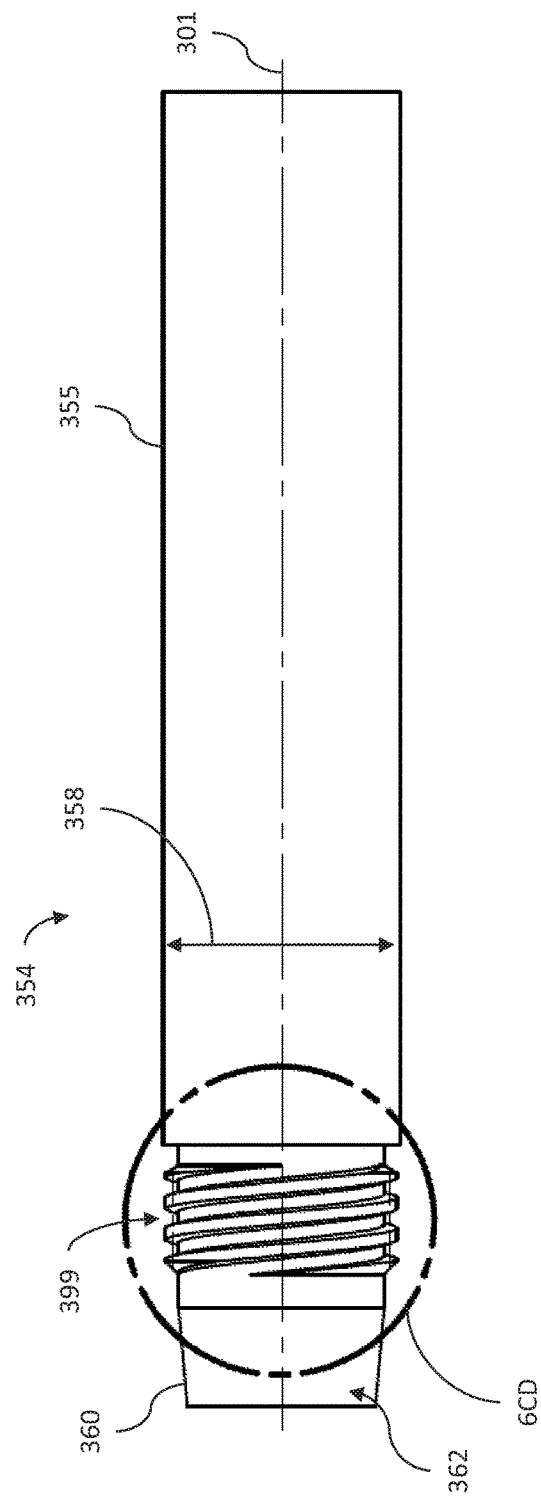
FIG. 6B is a side view of the example neck inner portion of FIG. 6A, in accordance with aspects of this disclosure.
Figure 6C:
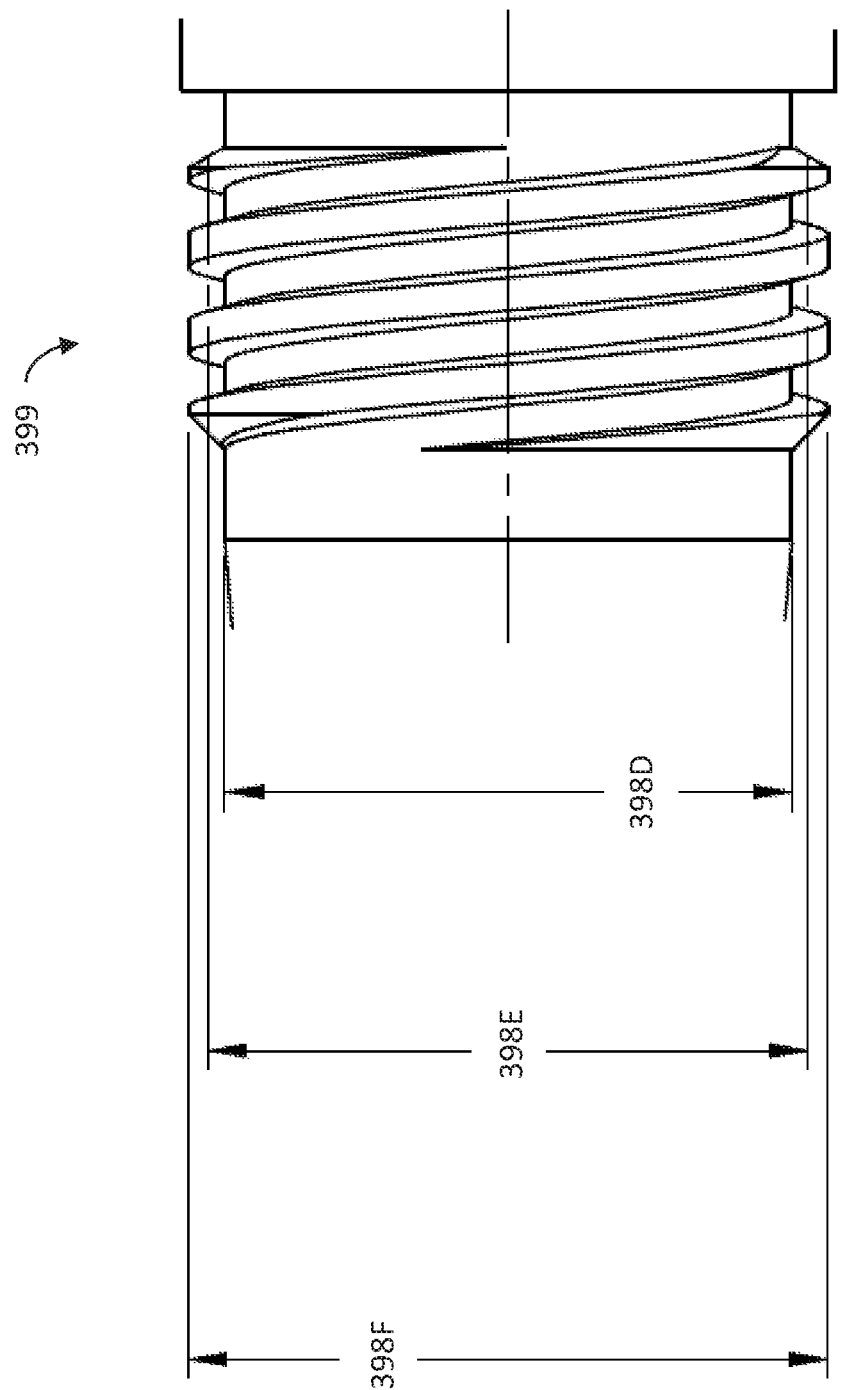

In some examples, the neck and nozzle assembly 300 further includes a gas diffuser 500 (e.g., an electrically conductive gas diffuser). FIGS. 5A-5C show various views of the gas diffuser 500. In the examples of FIGS. 5A-5C, the gas diffuser 500 has a nose 504 with gas holes 506 configured to allow gas (e.g., shielding gas) to diffuse through into an interior of the nozzle assembly 348. The nose 504 includes wrench flats 508 configured to allow a wrench to grip the nose 504 and/or tighten the gas diffuser 500 onto the neck assembly 346 (e.g., the neck inner portion 354). In the examples of FIGS. 5A-5C, the gas diffuser 500 further includes a generally cylindrical base 510, and a generally cylindrical midsection 512 that connects the nose 504 to the base 510. The outer diameter of the base 510 is larger than the outer diameter of the midsection 512 and the nose 504. The midsection 512 has an outer diameter that is smaller than that of the base 510, and larger than the outer diameter of the nose 504. The nose 504 has an outer diameter that is smaller than the outer diameters of the base 510 and the midsection 512. An O-ring 502 is fitted within an annular crevice on the outside of the base 510. The O-ring 502 may be configured to create a gas seal between the gas diffuser 500 and the nozzle insulator 308. The gas seal created by the O-ring may be configured to preclude gas from flowing backwards from the gas diffuser 500 towards the handle 38 of the welding torch 16.

In some examples, the gas diffuser 500 includes a seat 514 that is configured to receive the contact tip 356. A backwards facing taper of the contact tip 356 may interface and/or engage with a corresponding taper of the seat 514 of the gas diffuser 500. While the rear end of the contact tip 356 is disposed against the seat 514 of the gas diffuser 500, the tip-retention device 310 of the nozzle assembly 348 keeps the contact tip 356 in place. In some examples, a locking taper 320 (e.g., a forward-facing locking taper) of the contact tip 356 engages with a corresponding locking taper 321 of the tip-retention device 310 of the nozzle assembly 348. In some examples, the locking taper 320 is disposed closer to a rear end of the contact tip 356 than a front end of the contact tip 356. The contact tip 356 may be locked in place between the locking taper 321 of the tip-retention device 310 and the seat 514 of the gas diffuser 500. In some examples, the contact tip 356 does not need its own threads to be locked in place.

In the examples of FIGS. 5A-5C, the gas diffuser 500 further includes threaded grooves 599. The threaded grooves 599 may be configured to complement and/or engage screw threads 399 of the neck assembly 346. In the example of FIGS. 5A-5C, the threaded grooves 599 are formed on an interior surface of the base 510. The threaded grooves 599 travel (and/or extend) around the interior surface of the base 510 to form a spiral and/or corkscrew pattern. In some examples, the threaded grooves 599 may be double start threaded grooves 599. In the example of FIGS. 5A-5D, the threaded grooves 599 are double start stub ACME threaded grooves. As the threaded grooves 599 are double start, the threaded grooves 599 comprise two separate grooves: a first groove 599A and a second groove 599B (separated by protruding threads 599C). The threaded grooves 599 have a grooved engagement distance 592, a grooved lead distance 594, and a grooved pitch distance 596. The grooved engagement distance 592 is the total axial length of the threaded grooves 599, comprising the total axial distance complementary screw thread 399 can travel when engaging the threaded grooves 599. The grooved lead distance 594 comprises an axial distance between two of the same adjacent grooves (e.g., the distance between adjacent first grooves 599A), and the axial distance traversed during one complete revolution (and/or turn) within a groove. The grooved pitch distance 596 comprises an axial distance between any two adjacent grooves (e.g., adjacent first grooves 599A and/or second grooves 599B). The threaded grooves 599 further comprise a groove major diameter 598C (e.g., the diameter of the gas diffuser 500 at the threads 599C), a groove minor diameter 598A (e.g., the diameter of the gas diffuser 500 at the grooves 599A, 599B), and a groove pitch diameter 598B (average/mean of groove major diameter 598C and groove minor diameter 598A).

The neck assembly 346 may include screw threads 399 that are complementary to, and/or configured to engage, the threaded grooves 599 of the gas diffuser 500. More particularly, the neck inner portion 354 may include screw threads 399 complementary to the threaded grooves 599 of the gas diffuser 500. The screw threads 399 travel (and/or extend) around an outer surface of the neck assembly 346 to form a spiral and/or corkscrew pattern. In the examples of FIG. 6A-6D, the screw threads 399 are double start screw stub ACME screw threads, comprising a first screw thread 399A (configured to engage the first threaded groove 599A) and a second screw thread 399B (configured to engage the second threaded groove 599B). The first screw thread 399A is separated from the second screw thread 399B by recessed grooves 399C. The screw threads 399 have a threaded engagement distance 392, a threaded lead distance 394, and a threaded pitch distance 396. The threaded engagement distance 392 is the total axial length of the screw threads 399, comprising the total axial distance the screw threads 399 can travel when engaging the threaded grooves 599. The threaded lead distance 394 comprises an axial distance between the same adjacent threads (e.g., the distance between adjacent first screw threads 399), and the axial distance traversed during one complete revolution (and/or turn) of a screw thread within a complementary groove. The threaded pitch distance 396 comprises an axial distance between any two adjacent threads (e.g., between adjacent first screw threads 399A and/or second screw threads 399B).

The screw threads 399 further comprise a thread major diameter 398F (e.g., diameter of the neck inner portion 354 at the screw threads 399A, 399B), a thread minor diameter 398D (e.g., diameter of the neck inner portion 354 at the recessed grooves 399C), and a thread pitch diameter 398E (e.g., an average/mean diameter). In some examples, the groove major diameter 598C, groove minor diameter 598A, and/or groove pitch diameter 598B may be slightly greater than the thread major diameter 398F, thread minor diameter 398D, and/or thread pitch diameter 398E, respectively, in order to accommodate the screw threads 399 within the threaded grooves 599. In some examples, the groove major diameter 598C, groove minor diameter 598A, and/or groove pitch diameter 598B may be approximately equal to the thread major diameter 398F, thread minor diameter 398D, and/or thread pitch diameter 398E, respectively. The base 355 of the inner neck portion 354 may further comprise a base diameter 358.

Figure 8A:
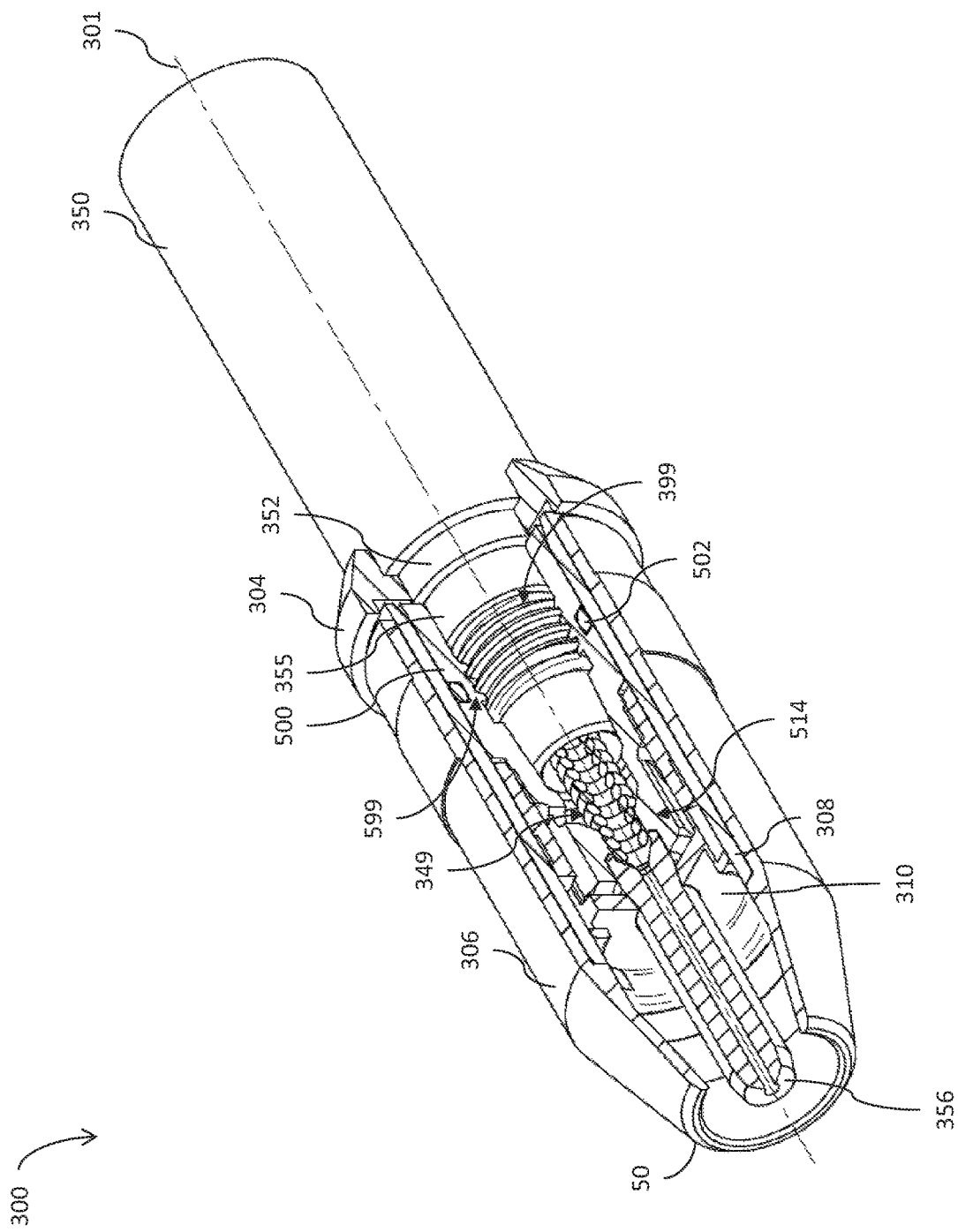
FIG. 8A is a perspective view of the example neck and nozzle assembly of FIG. 3A with a portion cutaway, in accordance with aspects of the present disclosure.
Figure 8B:
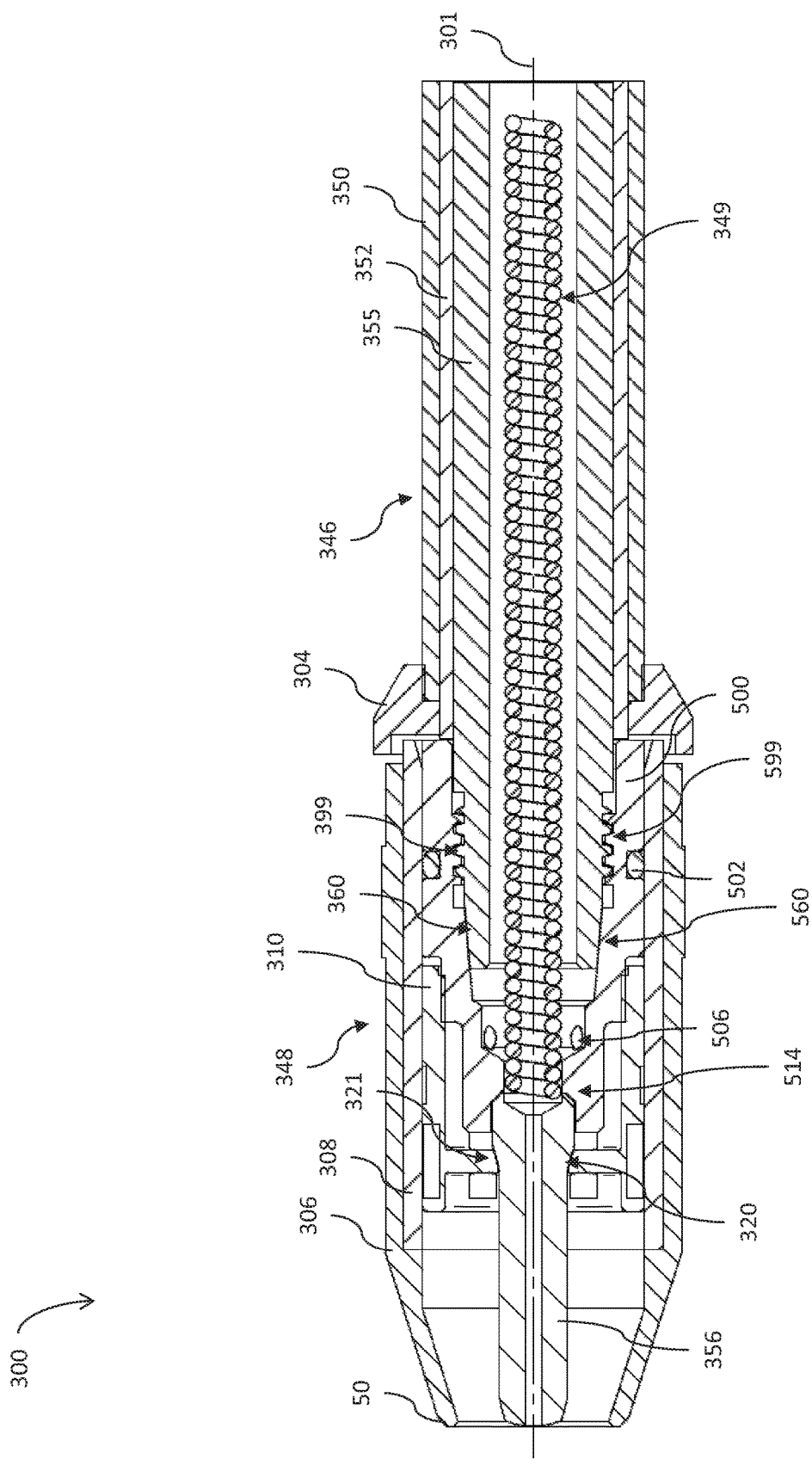
FIG. 8B is a cross-sectional view of the example neck and nozzle assembly of FIG. 3A, along the line 8B-8B of FIG. 3B, in accordance with aspects of the present disclosure.

FIGS. 8A and 8B show a cross-section view and a partial cutaway perspective view, respectively, of the example neck and nozzle assembly 300. In the example of FIGS. 8A and 8B, the gas diffuser 500 is coupled to the nozzle assembly 348 and neck assembly 346. The gas diffuser 500 may be attached to the nozzle assembly 348 via external threads (not shown) of the gas diffuser 500 mating with internal threads (not shown) of the nozzle assembly 348, and/or through a frictional fit. In the example of FIGS. 8A and 8B, the gas diffuser 500 is also attached to the tip-retention device 310 (e.g., a nozzle insert) of the nozzle assembly 348, such as through a frictional fit. The liner assembly 349 further extends into the gas diffuser 500, terminating adjacent the seat 514 so as to provide a route for the electrode 18 to move through the neck assembly 346 and gas diffuser 500 into the contact tip 356. The contact tip 356 is retained within the neck and nozzle assembly 300 by a frictional fit with the gas diffuser 500 (e.g., through the seat 514) and the tip-retention device 310. In the example of FIGS. 8A and 8B, the gas diffuser 500 is attached to the welding neck assembly 346 via threaded grooves 599 of the gas diffuser 500 mating with screw threads 399 of the welding neck assembly 346.

In operation, the gas diffuser 500 may be screwed onto the welding neck assembly 346 using the screw threads 399 of the welding neck assembly 346 and/or threaded grooves 599 of the gas diffuser 500. For example, the screw threads 399 of the welding neck assembly 346 may mate, interface, and/or engage with the threaded grooves 599 of the gas diffuser 500 to secure the gas diffuser 500 to the neck assembly 346. In some examples, the threaded grooves 599 of the gas diffuser 500 may be brought into contact with the screw threads 399 of the neck assembly 346, and the gas diffuser 500 may be turned (and/or rotated, twisted, moved, etc.) to connect the gas diffuser 500 to the neck assembly 346. In some examples, the turning of the gas diffuser 500 with respect to the welding neck assembly 346 may be achieved manually without any tools (e.g., a tool-less option) or may be turned using a tool (e.g., wrench, etc.) that is applied to, for example, the wrench flats 508. The wrench flats 508 may provide a gripping surface through which a tool (and/or hand) may tighten the gas diffuser 500 onto the welding neck assembly 346.

In some examples, the screw threads 399 and/or threaded grooves 599 may be configured such that the gas diffuser 500 may be coupled to and/or removed from the with approximately 1.5 turns or less. For example, the total threaded engagement distance 392 of the screw threads 399 may be approximately 1.5 times the threaded lead distance 394, or less (e.g. 1.3, 1.4, 1.5, 1.6, or 1.7 turns). In some examples, the total grooved engagement distance 592 of the threaded grooves 599 may be approximately 1.5 times the grooved lead distance 594 (or less). As the threaded lead distance 394 (and/or grooved lead distance 594) is the axial distance traveled by the screw threads 399 (and/or threaded grooves 599) over one turn of the neck assembly 346 (and/or gas diffuser 500), the neck assembly 346 (and/or gas diffuser 500) may travel the full threaded engagement distance 392 (and/or total grooved engagement distance 592) in approximately 1.5 turns (or less) when the total threaded engagement distance 392 (and/or total grooved engagement distance 592) is 1.5 times (or less) the threaded lead distance 394 (and/or grooved lead distance 594).

In some examples, the screw threads 399 and/or threaded grooves 599 may be configured such that the gas diffuser 500 may be coupled to and/or removed from the with approximately 2 turns or less (e.g., 1.8, 1.9, 2, 2.1, or 2.2 turns). For example, the total threaded engagement distance 392 of the screw threads 399 may be approximately 2 times the threaded lead distance 394 (or less). In some examples, the total grooved engagement distance 592 of the threaded grooves 599 may be approximately 2 times the grooved lead distance 594 (or less). As the threaded lead distance 394 (and/or grooved lead distance 594) is the axial distance traveled by the screw threads 399 (and/or threaded grooves 599) over one turn of the neck assembly 346 (and/or gas diffuser 500), the neck assembly 346 (and/or gas diffuser 500) may travel the full threaded engagement distance 392 (and/or total grooved engagement distance 592) in approximately 2 turns (or less) when the total threaded engagement distance 392 (and/or total grooved engagement distance 592) is 2 times (or less) the threaded lead distance 394 (and/or grooved lead distance 594).

In some examples, the total grooved engagement distance 592 may be approximately equal to the total threaded engagement distance 392. In some examples, the total grooved engagement distance 592 may be different from the total threaded engagement distance 392. In some examples, the threaded lead distance 394 may be approximately equal to the grooved lead distance 594, so that the screw threads 399 properly engage with the threaded grooves 599. In some examples, the threaded pitch distances 396 may be approximately half the threaded lead distances 394, and/or the grooved pitch distances 596 may be approximately half the grooved lead distances 594.

The table 700 of FIG. 7 shows various potential example dimensions (in inches) of the screw threads 399 on the welding neck assembly 346 and mating threaded grooves 599 in the gas diffuser 500 according to the present disclosure. More particularly, the table 700 shows potential major, minor, and pitch diameters for the screw threads 399 and/or threaded grooves 599. The table 700 also show potential threaded lead distances 394, threaded pitch distances 396, grooved lead distances 594, and/or grooved pitch distances 596. The second column (0.425-16) of the table 700 shows potential dimensions for a neck assembly 346 having a base diameter 358 of 0.438 inches, and a threaded engagement distance 392 (and/or grooved engagement distance 592) of 0.185 inches. The third column (0.527-14) of the table 700 shows potential dimensions for a neck assembly 346 having a base diameter 358 of 0.540 inches, and a threaded engagement distance 392 (and/or grooved engagement distance 592) of 0.215 inches. The "0.425" in "0.425-16" (and/or "0.527" in "0.527-14") refers to the max thread major diameter 398F. The "16" (and/or "14") is the thread pitch, comprising the number of threads per inch. The dimensions in the table 700 may be used to customize the screw threads 399 and/or threaded grooves 599 contemplated by the present disclosure. In some examples, the dimensions and/or tolerances of the screw thread 399 and/or threaded groove 599 features (e.g., major, minor, and/or pitch diameters, lead and/or pitch distances, locking tapers, etc.) may slightly alter the number of turns required.

Figure 9B:
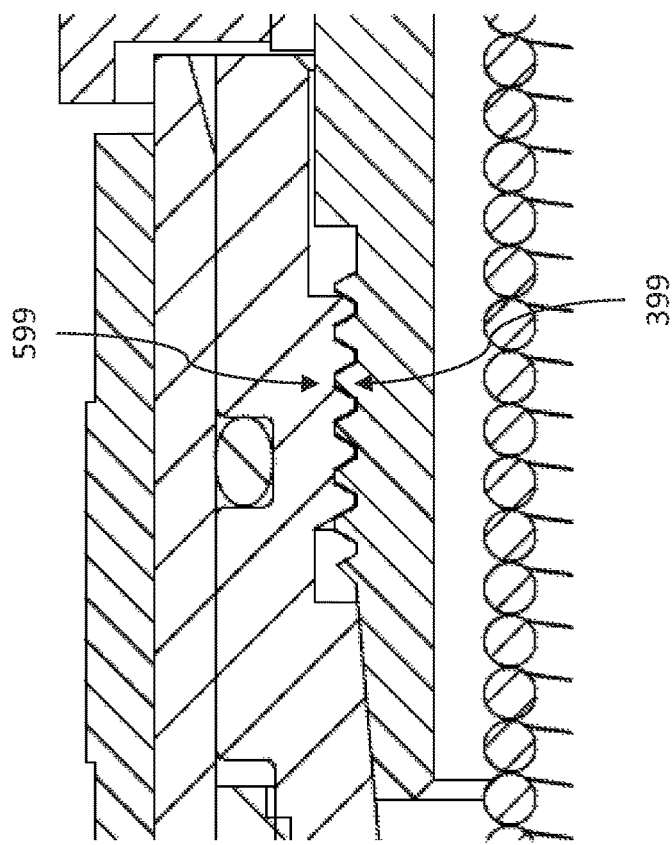
FIG. 9B shows a cross-sectional view of an example neck and nozzle assembly having custom double start ANSI-style screw threads and threaded grooves, in accordance with aspects of the present disclosure.
Figure 9A:
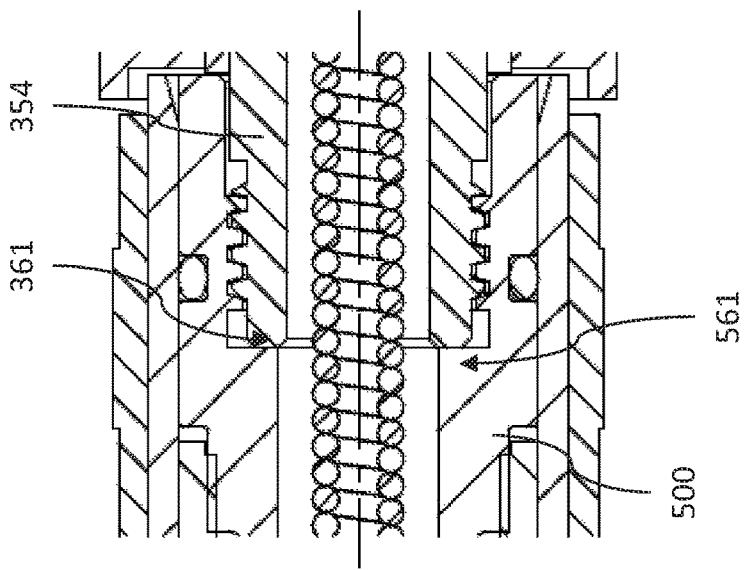
FIG. 9A is a cross-sectional view of an example neck and nozzle assembly in which an example gas diffuser and example neck assembly have a face-to-face bearing surface, in accordance with aspects of the present disclosure.

FIG. 9A shows a cross-sectional view of an example gas diffuser 500 and/or welding neck assembly 346 in which the screw threads 399 and/or threaded grooves 599 are used with a face-to-face bearing surface version of the gas diffuser 500 and welding neck assembly 346. In the example of FIG. 9A, the gas diffuser 500 includes a bearing surface 561 rather than a locking taper 560, and the neck inner portion 354 of the neck assembly 346 includes a complementary bearing surface 361 rather than the locking taper 360. The bearing surface 561 of the gas diffuser 500 abuts (and/or interacts/interfaces with, engages, etc.) the complementary bearing surface 261 of the neck inner portion 354 to assist in locking the gas diffuser 500 and the welding neck assembly 346 with respect to each other. FIG. 9B shows a cross-sectional view of an example gas diffuser 500 and/or welding neck assembly 346 in which the screw threads 399 and/or threaded grooves 599 are custom double start ANSI-style threads/grooves, rather than ACME style threads/grooves.

While the above disclosure refers to screw threads 399 of the neck assembly 346 and threaded grooves 599 of the gas diffuser 500, in some examples the neck assembly 346 may include the threaded grooves 599 and the gas diffuser 500 may include the screw threads 399. It is further understood that the screw threads 399 include grooves between threads, and the threaded grooves 599 include threads between grooves, and that all of these features may interact (and/or engage, interface, interlock, abut, etc.) when coupling the gas diffuser 500 to the neck assembly 346.

Figure 10A:
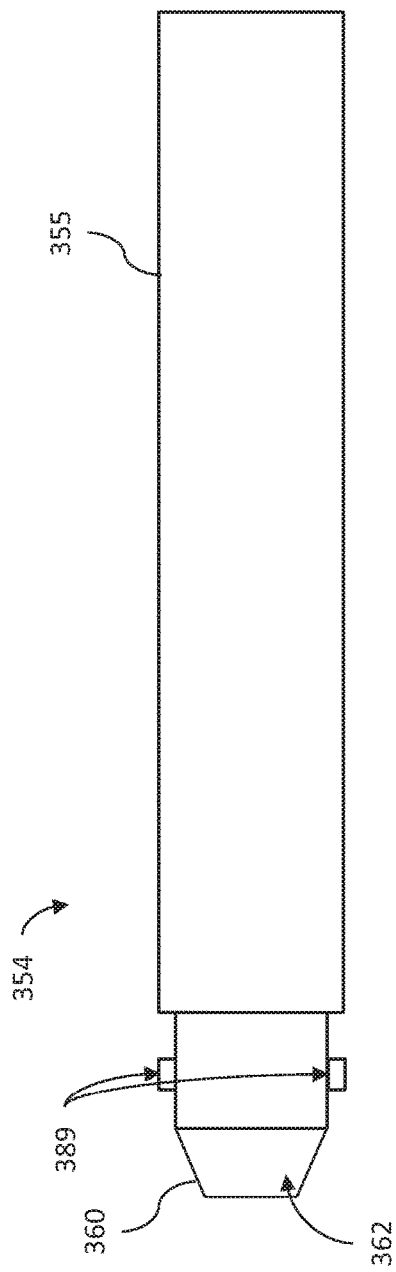
FIG. 10A is a side view of another example neck inner portion, in accordance with aspects of this disclosure.
Figure 10B:
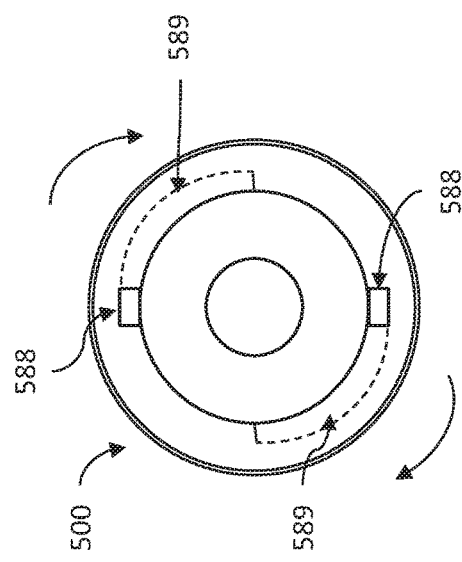
FIG. 10B is an end view of another example gas diffuser, in accordance with aspects of this disclosure.

FIGS. 10A and 10B show an example gas diffuser 500 and neck inner portion 354 having a different quick connect configuration. FIG. 10A shows a side view of an example neck inner portion 354 of the example welding neck assembly 346 in which the screw threads 399 are replaced with keyed protrusions 389. FIG. 10B shows a rear end view of an example gas diffuser 500 in which the threaded grooves 599 are replaced with keyways 588 configured to receive the protrusions 389, and channels 589 with which the protrusions 389 may interface, and/or in which the protrusions 389 may move. In some examples, the gas diffuser 500 may instead be formed with the protrusions 389, and the neck inner portion 354 may be formed with the keyways 588 and/or channels 589.

In the example of FIG. 10A, the keyed protrusions 389 are formed on the neck inner portion 354 of the welding neck assembly 346, between the nose 362 and the base 355. The protrusions 389 are substantially aligned along the neck inner portion 354. In some examples, the protrusions 389 may instead be offset. In the example of FIG. 10A, there are two protrusions 389, though in some examples there may be more or less than two protrusions 389 (e.g., one protrusion, three protrusions, four protrusions, etc.).

In the example of FIG. 10B, the keyways 588 and/or channels 589 are formed on/in the interior surface of the base 355 of the gas diffuser 500. The keyways 588 are formed on/in the interior surface of the base 355, beginning at the rear of the gas diffuser 500 and extending towards the nose 362, so as to provide an avenue for the keyed protrusions 389 to reach the channels 589. In some examples, the keyways 588 may be configured to be a length sufficient to allow the locking tapers 360, 560 to abut (and/or interface, engage, etc.) by the time the protrusions 389 reach the channels 589. In some examples (such as where the channels 589 are formed helically, for example), the keyways 588 may be configured to be a length that requires the protrusions 389 to be turned within the channels before the locking tapers 360, 560 abut (and/or interface, engage, etc.).

While two keyways 588 are shown in the example of FIG. 10B, in other examples there may be more or less keyways. The keyways 588 may be configured to complement the configuration of the keyed protrusions 389 (e.g. with respect to spacing, size, etc.). In some examples, there may be more keyways 588 than keyed protrusions 389. If not aligned properly with the keyways 588, the protrusions 389 may abut the gas diffuser 500 and prevent the protrusions 389 from reaching the channels 589, and/or prevent the gas diffuser 500 and welding neck assembly 346 from coupling.

In the example of FIG. 10B, the channels 589 begin at the axial ends of the keyways 588. The channels 589 comprise arcs centered about the longitudinal axis 301 of the gas diffuser 500, and extending around the interior surface of the gas diffuser 500 in a radial (and/or circumferential, circular, radially tangential, etc.) direction. In the example of FIG. 10B, there are two channels 589 that extend approximately a quarter of the way around the circumference of the gas diffuser 500. In some examples, there may be more or fewer channels 589. In some examples, the channels 589 may extend an eight of the way around the circumference, halfway around the circumference, all the way around the circumference (such as if there is only one keyway, or multiple offset keyways, for example), and/or more than all the way around the circumference. In some examples, the channels 589 may be formed helically. In some examples, the channels 589 may be formed more circularly. The channels 589, like the keyways 588, may be configured to complement the configuration of the keyed protrusions 389.

In operation, the protrusions 389 may be aligned with the keyways 588 when connecting the gas diffuser 500 to the welding neck assembly 346, and then moved within the channels 589 (e.g., through a twisting and/or turning motion of the gas diffuser 500 and/or neck inner portion 354) to lock the gas diffuser 500 to the welding neck assembly 346. In the example of FIGS. 10A and 10B, the connection may be made in a quarter turn or less. Once turned, the keyed protrusions 389 may be out of alignment with the keyways 588, thus preventing (and/or resisting) decoupling. In some examples, an axial width of the channels 589 may shrink (and/or narrow, reduce, change, etc.) as the channels 589 extend radially around the gas diffuser 500. This change in width may squeeze the protrusions 389 between the sidewalls of the channels 589 when the gas diffuser 500 and/or neck inner portion 354 is rotated, thereby forming a frictional engagement that resists decoupling.

In some examples, a spring may be included within gas diffuser 500. The spring may be configured to provide an axial spring force that pushes against the protrusions 389 when the protrusions 389 enter the keyway 588 and/or the channels 589. Thus, the protrusions 389 may compress the spring when pushed into the keyways 588 to reach the channels 589, and the spring force may push the protrusions 389 back against the walls of the channels 589 once the protrusions are rotated out of alignment with the keyways 588.

While the present apparatuses, systems, and/or methods have been described with reference to certain implementations, it will be understood by those skilled in the art that various changes may be made and equivalents may be substituted without departing from the scope of the present apparatuses, systems, and/or methods. In addition, many modifications may be made to adapt a particular situation or material to the teachings of the present disclosure without departing from its scope. Therefore, it is intended that the present apparatuses, systems, and/or methods not be limited to the particular implementations disclosed, but that the present apparatuses, systems, and/or methods will include all implementations falling within the scope of the appended claims.

What is claimed is:

1. A welding torch, comprising:
   a neck assembly comprising a locking taper, an insulator, and a neck inner having a protrusion disposed between the locking taper and the insulator, the protrusion being configured to interface with a passage of a gas diffuser, wherein the protrusion is configured to remove the gas diffuser from the neck inner in between approximately 0.25 and 1.5 turns; and
   the gas diffuser having a passage that extends both axially and radially, the passage configured to interface with the protrusion to connect the gas diffuser to the neck assembly in approximately 1.5 turns or less.

2. The welding torch according to claim 1, wherein the protrusion is a screw thread, and the passage is a threaded groove.

3. The welding torch according to claim 2, wherein the screw thread and the threaded groove are based on a custom double-start stub ACME thread.

4. The welding torch according to claim 1, wherein the gas diffuser comprises a front portion configured to connect with a contact tip and a rear portion opposite the front portion, the passage extending at least partially from the rear portion towards the front portion.

5. The welding torch according to claim 2, wherein the screw thread comprises a first thread and a second thread, and wherein the threaded groove comprises a first groove configured to interface with the first thread, and a second groove configured to interface with the second thread.

6. The welding torch according to claim 2, wherein the screw thread or the threaded groove has a total axial length that is approximately 1.5 times or less an axial lead length of the screw thread or the threaded groove.

7. The welding torch according to claim 1, wherein the passage comprises an axially extending keyway that leads to a radially extending channel.

8. The welding torch according to claim 1, wherein the neck assembly further includes an outer neck armor, wherein the outer neck armor surrounds the insulator, and wherein at least part of the neck inner is positioned within the insulator.

9. The welding torch of claim 5, wherein the first thread is adjacent the second thread, and the first thread is not continuous with the second thread.

10. The welding torch of claim 5, wherein the first groove is adjacent the second groove, and the first groove is not continuous with the second groove.

11. The welding torch of claim 6, wherein the total axial length comprises a total axial distance that the screw thread or the threaded groove can travel when engaging the threaded groove or the screw thread, respectively.

12. The welding torch of claim 6, wherein the screw thread comprises a first thread and a second thread that is adjacent to, but not continuous with, the first thread, and the axial lead length of the screw thread comprises an axial distance between adjacent portions of the first thread.

13. The welding torch of claim 6, wherein the screw thread comprises a first thread and a second thread that is adjacent to, but not continuous with, the first thread, and the axial lead length of the screw thread comprises an axial distance between adjacent portions of the second thread.

14. The welding torch of claim 6, wherein the threaded groove comprises a first groove and a second groove that is adjacent to, but not continuous with, the first groove, and the axial lead length of the threaded groove comprises an axial distance between adjacent portions of the first groove.

15. The welding torch of claim 6, wherein the threaded groove comprises a first groove and a second groove that is adjacent to, but not continuous with, the first groove, and the axial lead length of the threaded groove comprises an axial distance between adjacent portions of the second groove.

* * * * *